June 3, 1930.　　　J. D. BETTS　　　1,761,172
WATER HEATER
Filed May 12, 1927
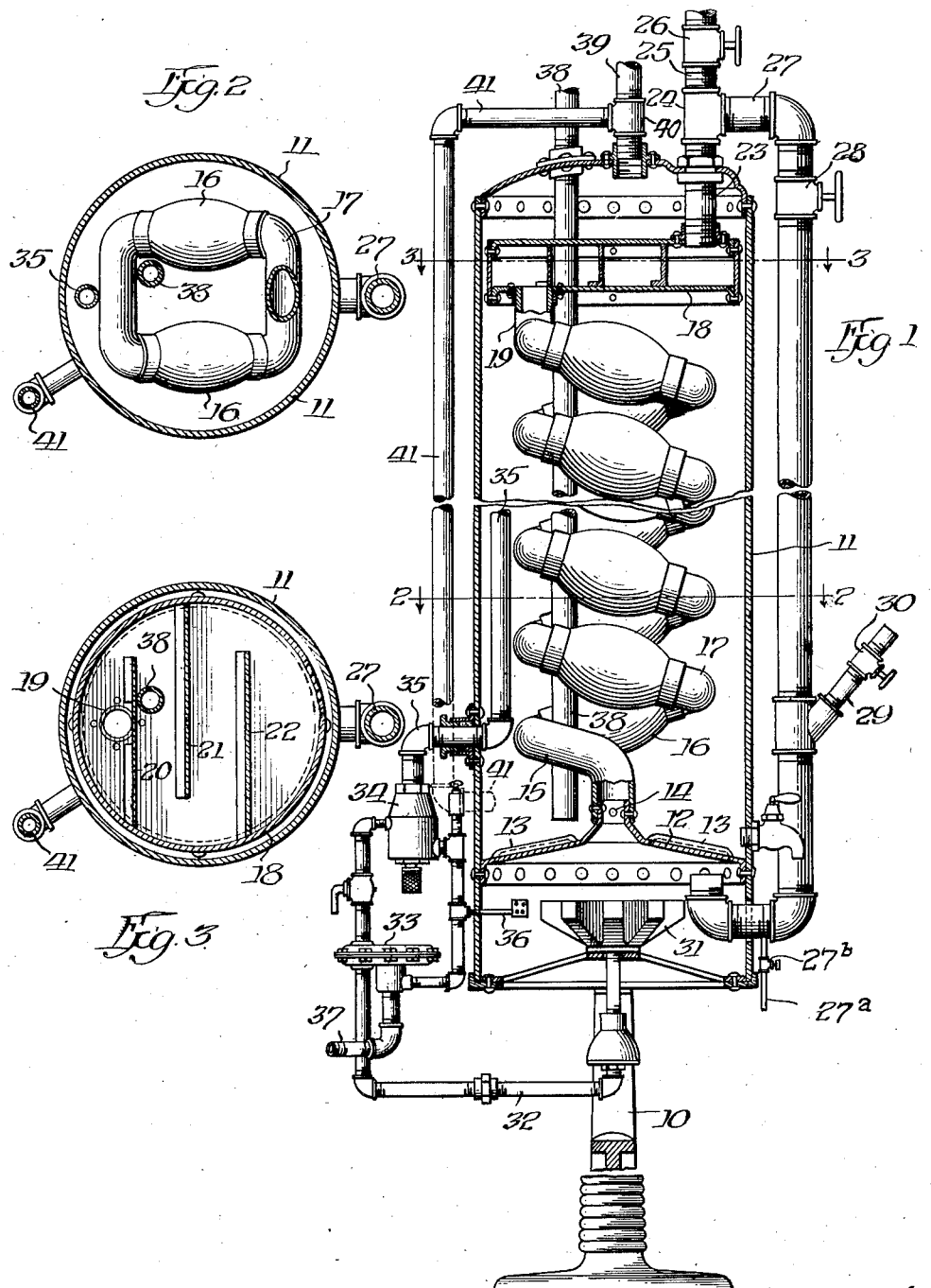
Inventor:
John D. Betts.
By Wilkinson, Huxley, Byron & Knight
Attys Patented June 3, 1930

1,761,172

UNITED STATES PATENT OFFICE

JOHN D. BETTS, OF CHICAGO, ILLINOIS

WATER HEATER

Application filed May 12, 1927. Serial No. 190,735.

My invention relates to water heaters and has particular reference to water heaters of the cylindrical type in which heat is supplied by a gas burner and has for its primary object the quick heating of water contained within the cylindrical container, for either domestic purposes or for use in connection with heating plants.

Another and further object of my invention is the provision of a water heater having a coil extending longitudinally thereof which is made up of bulbous or enlarged sections of pipe forming heat traps throughout the length of the coil and thereby providing a large surface so that the heat from the gases is absorbed by the water very quickly with the result that the water is heated very rapidly.

Another and further object of my invention is the provision of a water heater having a water circulating pipe therein so that all of the water contained in the heater is uniformly heated and to a high degree with a minimum consumption of fuel.
Another and further object of my invention is the provision of a water heater having a heating coil extending throughout the length of the said container and having a large trap or heat container at the top thereof so as to utilize the heated air and gases to the fullest extent possible and reduce the emperature of the gases to that of the water.

These and other objects of my invention will be more readily and better understood with reference to the accompanying drawings, in which—

Figure 1 is a vertical sectional view embodying my invention;

Figure 2 is a transverse sectional view on lines 2—2 of Figure 1; and

Figure 3 is a transverse sectional view showing the heat trap in said tank.

Referring now specifically to the drawings, and in which like reference characters refer to like parts thereof, a pedestal or base 10 is shown having a cylindrical tank 11 mounted thereon, the said tank 11 having a circular arched burner plate 12 located a short distance from the bottom thereof having a series of corrugations 13, 13 therein, so that a heating chamber is formed at the lower end of the container, the said burner plate 12 having an opening 14 provided therein through which a short curved pipe section 15 is connected, forming a water-tight joint with the plate 12. Attached to the pipe 15 is a bulb 16 which extends upwardly and transversely of the container 11, and has connected thereto a short elbow 17 which is connected to another bulb 16, together with the other curved sections of pipe similar to 17 and other bulbs similar to 16, forms a coil which extends throughout the entire length of the tank 11, and is connected to a circular heat trap or drum 18 mounted in the upper end of the tank 11, by a short pipe section 19. The heat trap 18 has a plurality of baffles 20, 21 and 22 therein which extend parallel with each other transversely across the trap 18 and in spaced relation with each other, and are secured at one of their ends to the vertical wall of the trap, and at their opposite ends terminate short of the side wall of the trap 18, thereby causing the combustion gases to travel around the ends of the said baffle plates as they pass through the heater.

An outlet pipe 23 is connected to the heat trap 18 which extends upwardly through the top of the tank and thence downwardly on the outside of the tank 11 to a T 24 to which is connected the usual outlet pipe 25 having a valve 26 therein, and which leads to a chimney or other suitable outlet. A second pipe 27 is connected to the T 24 which extends downwardly on the outside of the tank 11 and thence through the side wall of the tank below the plate 12, where the said pipe 19 is curved inwardly into the heating chamber in such position that the combustion gases passing therefrom strike against the plate 12 and are returned through the coils in the tank 11. A valve 28 is provided by means of which this pipe is closed if desired. A short section of pipe 29 is provided having a valve 30 therein and which is connected to the pipe 27 for the purpose of supplying outside air to the pipe 27 at any time it may be desired so that an additional supply of air can be induced into the pipe line either for the purpose of increasing combustion or for assisting in cooling the tank if it is so desired. A drip pipe 27ª is connected to the pipe 27, having a cock 27ᵇ secured thereto by means of which the condensate is allowed to escape from the pipe 27.

The usual form of gas burner 31 is provided which is positioned in the heating chamber below the plate 12 and which has a gas supply pipe 32 connected thereto leading to a valve 33 which is controlled by a thermostat 34 having a pipe 35 connected thereto and which extends into the tank 11 so that water from the tank 11 is brought into the thermostat 34. The purpose of the thermostat is to control the temperature of the water. This thermostat is of the usual commercial form and is adapted to shut off the supply of gas leading to the burner when the water in the tank reaches a predetermined temperature. The thermostat may, of course, be adjusted so as to decrease the supply of gas flowing to the burner 31 or to shut it off entirely as may be desired.

A pilot light 36 is provided which is adapted to automatically light the gas entering the gas burner 31 when the supply thereof is shut off by the thermostat. A gas supply pipe 37 is provided which leads to the valve 33 from any suitable source of gas supply.

A water inlet pipe 38 is provided which extends longitudinally of the tank and terminates near the bottom thereof just above the burner plate 12 so that the cold water which is introduced into the tank through the pipe 38 is brought into contact immediately with the plate 12 which, by reason of the flame therefrom passing upward against the plate 12, is the hottest part of the tank so that this water is heated quickly as soon as it enters the tank. An outlet pipe 39 is provided having a T 40 secured thereto to which a water circulatory pipe 41 is connected and through which water is circulated to the bottom of the tank 11 as this pipe extends downwardly on the outside of the tank 11 and there enters the tank through the side wall thereof, as will be seen by reference to Figure 1.

In operation, the device is substantially automatic after the pilot light is lighted. The thermostat controls the passage of gas to the burner 31 and the quantity of gas supplied thereto, which is lighted by the pilot light and the flame from the gas burner passes upward against the curved burner plate 12 and along the corrugated surface of the plate and through the opening 14 into the pipe 15 and thence into the bulb 16 which, because of its enlarged size allows the flame to slow up in its movement and is in effect a pocket, into which the flame passes and because of the curvature of the pipe section 15, causes the flame to eddy or whirl into the bulb 16, retarding its passage through the bulb 16, and allowing the water more time to absorb heat therefrom than if the flame passed through the bulb. The curvature of the sides of the bulb is such that the flame does not channel therethrough, leaving cooled gases along the edges of the bulb 16. The height to which the flame travels depends upon the rate of combustion of the gas, the amount of draft, and the temperature of the water in the heater. The products of combustion pass upward through the elbows 17 and the bulbs 16, passing through the bulbs 16 with a whirling or eddying movement and into the heat trap 18 where they pass around the ends of the baffle plates and out through the outlet pipe 23. These gases may be allowed to escape to a chimney or to the atmosphere through the pipe 25 by opening the valve 26, or this valve may be closed and the valve 28 opened allowing the products of combustion to pass into the pipe 27. Under these conditions the travel of these gases is very slow and the moisture therein is condensed as it passes downward through the pipe 27, where it is allowed to escape through the drip pipe, and the very small quantity of gas remaining passes out through the end of the pipe 27 under the burner plate 12. This gas has no effect upon the gas combustion, because of the quantity of air which reaches the burner through the open lower end of the tank 11. When desired to increase the capacity of the apparatus, the pipe 26 is connected to a chimney or in a pipe line containing an induction fan, in which case the tank 11, and heating elements should be greater in length than when used as a water heater only for domestic purposes. If used as a part of a hot water heating system a pipe is connected to the pipe 39 which leads to the radiators and the inlet pipe 38 is connected to the proper supply or expansion tank.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A water heater comprising in combination, a shell having water inlet means and water outlet means, a burner, a burner plate having an opening therein, a coil in said shell extending longitudinally thereof composed of curved sections and bulbous sections alternately placed with relation to each other, a heat trap, baffles in said heat trap, and an outlet pipe connected to said heat trap.

2. A water heater comprising a shell having a combustion chamber and a water compartment therein, a burner plate separating the combustion chamber and the water compartment, said burner plate having an opening centrally thereof, a heating coil connected to said burner plate and extending spirally substantially throughout the length of the water compartment, said heating coil being composed of a plurality of bulbs with elbows connected to said bulbs, and an outlet pipe through which the products of combustion escape from said coil.

3. A water heater comprising a shell having a combustion chamber and a water compartment therein, a burner plate separating the combustion chamber and the water compartment and having a central opening therein, a heating coil connected at one of its ends to said burner plate and extending spirally substantially throughout the length of the water compartment, said heating coil being composed of bulbs in spaced vertical relation with each other and elbows connecting the bulbs at their ends, and an outlet pipe through which the products of combustion escape from the said coil.

4. A water heater comprising a shell having a combustion chamber and a water compartment therein, a burner plate having an opening centrally thereof, a heating coil connected to said burner plate and extending spirally substantially throughout the length of the water compartment, said heating coil being composed of a plurality of bulbs with elbows connecting the said bulbs, a heat trap in said water compartment extending substantially throughout the entire cross sectional area of said shell, a plurality of transversely extending baffle plates in said shell terminating short of the side wall thereof at one side, and an outlet pipe extending through said shell and connected to said heat trap.

Signed at Chicago, Illinois, this 26th day of April, 1927.

JOHN D. BETTS.